US012307649B2

United States Patent
Yang et al.

(10) Patent No.: US 12,307,649 B2
(45) Date of Patent: May 20, 2025

(54) METHOD FOR DETECTING PRODUCT DEFECT IN DETECTION IMAGE, COMPUTING DEVICE, AND STORAGE MEDIUM

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW); Tzu-Chen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 540 days.

(21) Appl. No.: 17/560,663

(22) Filed: Dec. 23, 2021

(65) Prior Publication Data

US 2022/0207714 A1     Jun. 30, 2022

(30) Foreign Application Priority Data

Dec. 29, 2020   (CN) .......................... 202011599676.9

(51) Int. Cl.
*G06T 7/00*        (2017.01)
*G06N 3/088*       (2023.01)
(Continued)

(52) U.S. Cl.
CPC .......... *G06T 7/0006* (2013.01); *G06N 3/088* (2013.01); *G06V 10/225* (2022.01); *G06V 10/26* (2022.01);
(Continued)

(58) Field of Classification Search
CPC ......... G06T 7/0006; G06T 2207/20081; G06T 2207/20084; G06T 2207/30108; G06T 2207/20021; G06T 7/0004; G06T 2207/30136; G06N 3/088; G06N 3/045; G06N 20/00; G06N 3/04; G06V 10/225;
(Continued)

(56) References Cited

U.S. PATENT DOCUMENTS 10,803,646 B1 *  10/2020  Bogan, III  ............. G06V 10/82
2020/0364842 A1  11/2020  Chaton

FOREIGN PATENT DOCUMENTS

CN      103473767 A    12/2013
CN      111402226 A    7/2020
(Continued)

OTHER PUBLICATIONS

"Fabric Defect Detection Based on Image reconstruction with Auto-encoder" by Ou Qing-fang and Xie Huo-sheng, published by Jisuanji Yu Xiandaihua, p. 27-32, and p. 39. Dec. 31, 2019.

*Primary Examiner* — Hwa Andrew Lee
(74) *Attorney, Agent, or Firm* — ScienBiziP, P.C.

(57) ABSTRACT

In a product defect detection method, a detection image of a product is obtained. A first preset number of detection blocks are cut out from the detection image. The detection blocks are input into an auto-encoder to obtain reconstructed blocks and a mean square error between each detection block and the corresponding reconstructed block is calculated, an association between the mean square error and the detection block being established. Whether the product carries defective is determined according to the mean square error of each detection block. The method improves accuracy of detecting defects of the product.

18 Claims, 2 Drawing Sheets

(51) Int. Cl.
*G06V 10/22* (2022.01)
*G06V 10/26* (2022.01)
*G06V 10/774* (2022.01)

(52) U.S. Cl.
CPC .. *G06V 10/774* (2022.01); *G06T 2207/20081* (2013.01); *G06T 2207/20084* (2013.01); *G06T 2207/30108* (2013.01); *G06V 2201/06* (2022.01)

(58) Field of Classification Search
CPC .. G06V 10/26; G06V 10/774; G06V 2201/06; G06V 10/762; G06V 10/82; G06F 18/214
See application file for complete search history.

(56) References Cited

FOREIGN PATENT DOCUMENTS

| | | |
|---|---|---|
| WO | 2020031984 | 2/2020 |
| WO | WO-2020031984 A1 * | 2/2020 |

* cited by examiner

METHOD FOR DETECTING PRODUCT DEFECT IN DETECTION IMAGE, COMPUTING DEVICE, AND STORAGE MEDIUM

FIELD

The present disclosure relates to product quality control technology field, in particular to a product defect detection method, a computing device, and a storage medium.

BACKGROUND

Usually, a reconstruction error between a reconstructed image of a test product and a reference image of a perfect product is calculated for detecting defects on surfaces of the test product. However, a detection precision of this method is not high.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
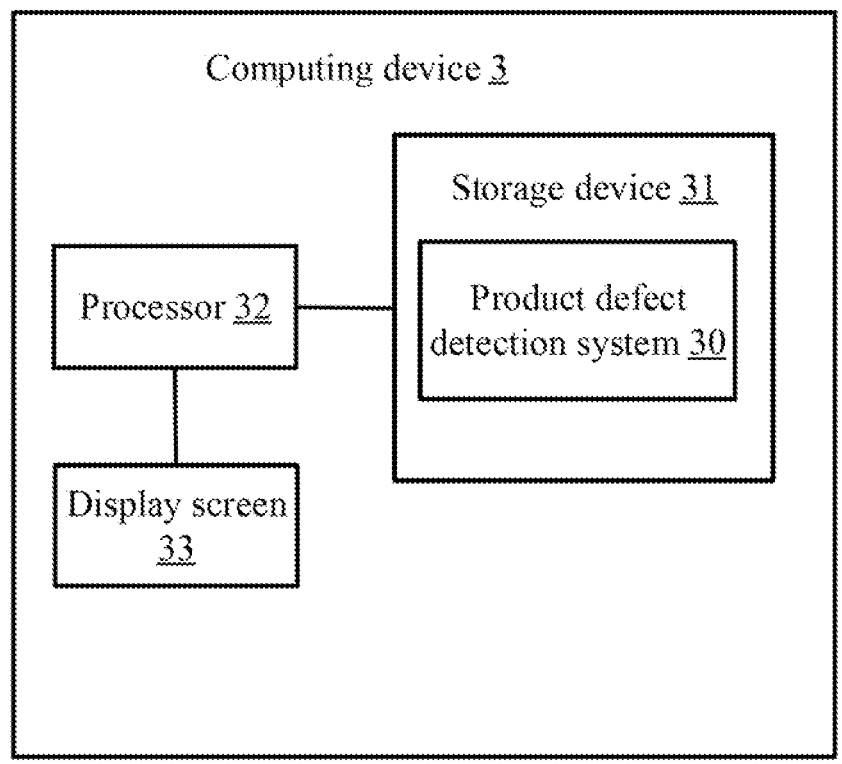
FIG. 1 illustrates a computing device according to one embodiment of the present disclosure.

FIG. 1 illustrates a computing device of the present disclosure.

In one embodiment, the computing device 3 includes a storage device 31, at least one processor 32, and a display screen 33. The storage device 31 and the display screen 33 are in electrical communication with the at least one processor 32.

Those skilled in the art should understand that the structure of the computing device 3 shown in FIG. 1 does not constitute a limitation of the embodiment of the present disclosure. Other examples of computing device 3 can further include more or less other hardware or software than that shown in FIG. 1, or the computing device 3 can have different component arrangements.

It should be noted that the computing device 3 is merely an example. If another kind of computing device can be adapted to the present disclosure, it should also be included in the protection scope of the present disclosure, and incorporated herein by reference In some embodiments, the storage device 31 may be used to store program codes and various data of computer programs. For example, the storage device 31 may be used to store a product defect detection system 30 installed in the computing device 3 and implement completion of storing programs or data during an operation of the computing device 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different function. The at least one processor 32 includes one or more central processing units (CPUs), one or more microprocessors, one or more digital processing chips, one or more graphics processors, and various control chips. The at least one processor 32 is a control unit of the computing device 3. The at least one processor 32 uses various interfaces and lines to connect various components of the computing device 3, and executes programs or modules or instructions stored in the storage device 31, and invokes data stored in the storage device 31 to perform various functions of the computing device 3 and to process data, for example, perform a function of detecting product defect (for details, see the description of FIG. 3).

In this embodiment, the product defect detection system 30 can include one or more modules. The one or more modules are stored in the storage device 31 and are executed by at least one processor (e.g. processor 32 in this embodiment), such that a function of detecting product defect (for details, see the introduction to FIG. 3 below) is achieved.

Figure 2:
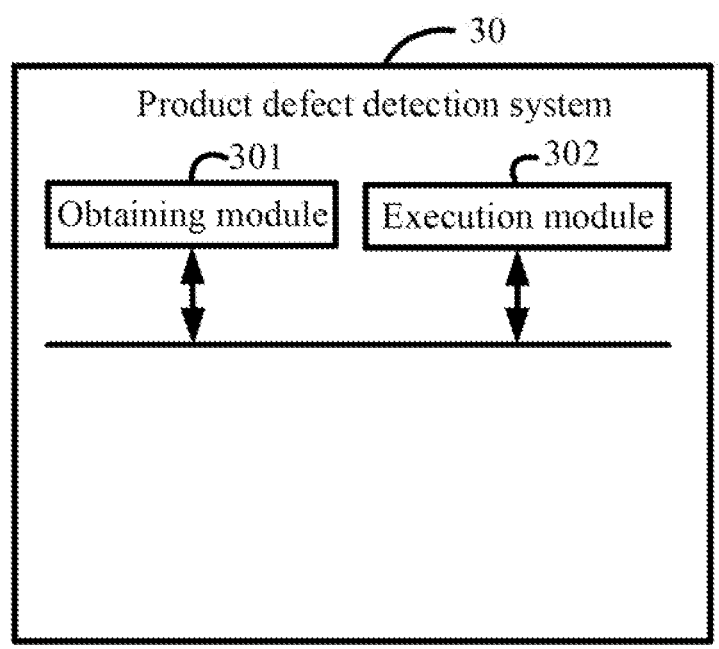
FIG. 2 shows one embodiment of modules of a product defect detection system of the present disclosure.

In this embodiment, the product defect detection system 30 can include a plurality of modules. Referring to FIG. 2, the plurality of modules includes an obtaining module 301 and an execution module 302. The modules referred to in the present disclosure refers to a series of computer-readable instructions that can be executed by at least one processor (for example, the processor 32), and can complete functions, and can be stored in a storage device (for example, the storage device 31 of the computing device 3). In this embodiment, functions of each module will be described in detail with reference to FIG. 3.

Figure 3:
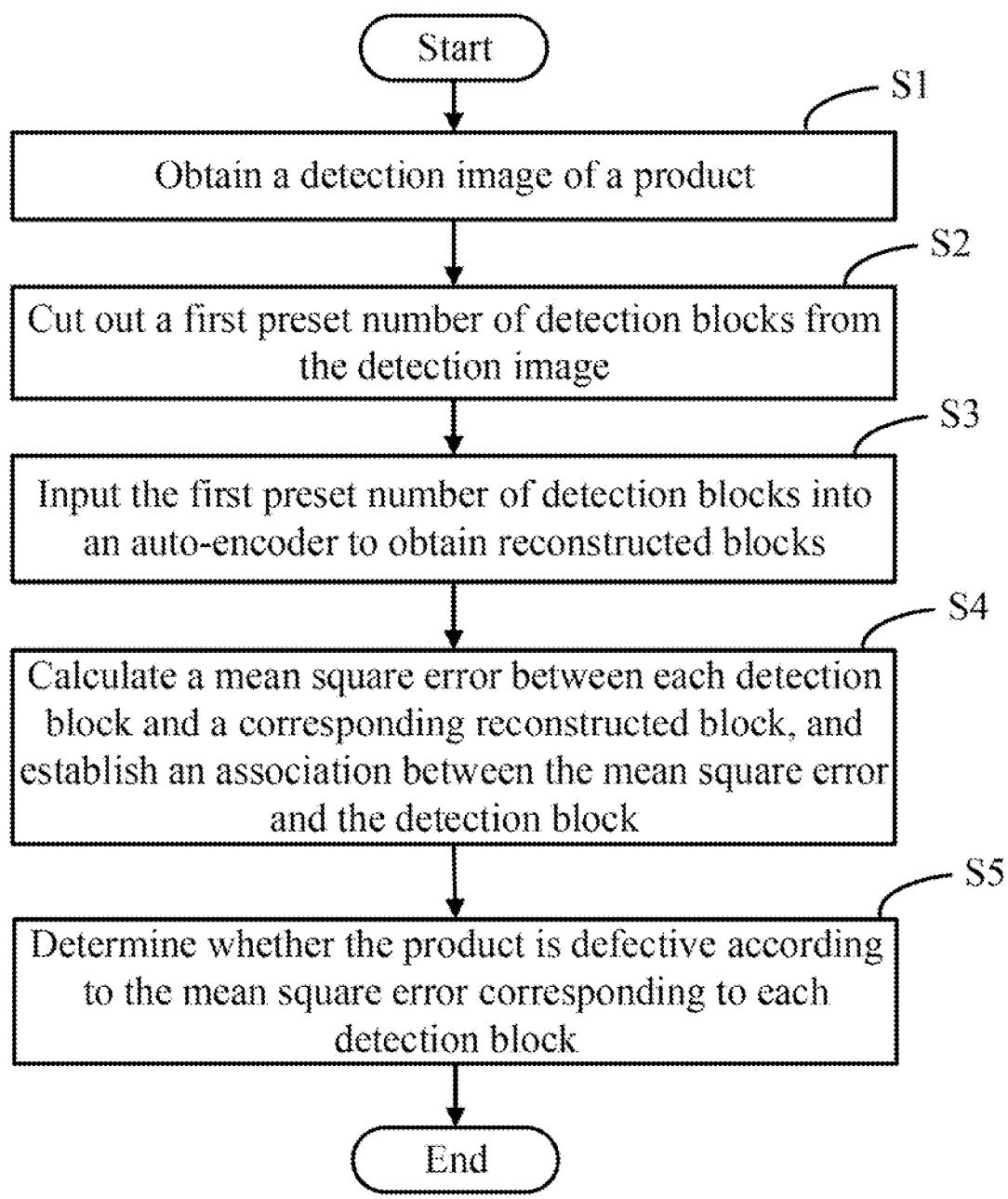
FIG. 3 shows a flow chart of one embodiment of a product defect detection method of the present disclosure.

In this embodiment, an integrated unit implemented in a form of a software module can be stored in a non-transitory readable storage medium. The above modules include one or more computer-readable instructions. The computing device 3 or a processor implements the one or more computer-readable instructions, such that the method for detecting product defect shown in FIG. 3 is achieved.

In a further embodiment, referring to FIG. 2, the at least one processor 32 can execute an operating system of the computing device 3, various types of applications (such as the product defect detection system 30 described above), program codes, and the like.

In a further embodiment, the storage device 31 stores program codes of a computer program, and the at least one processor 32 can invoke the program codes stored in the storage device 31 to achieve related functions. For example, each module of the product defect detection system 30 shown in FIG. 2 is program code stored in the storage device 31. Each module of the product defect detection system 30 shown in FIG. 2 is executed by the at least one processor 32, such that the functions of the modules are achieved, and the purpose of detecting product defect (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of detecting product defect. Specifically, the computer-readable instructions executed by the at least one processor 32 to achieve the purpose of detecting product defect is described in detail in FIG. 3 below.

FIG. 3 is a flowchart of a product defect detection method according to a preferred embodiment of the present disclosure.

In this embodiment, the product defect detection method can be applied to the computing device 3 of FIG. 1. For the computing device 3 used to detect product defect, the computing device 3 can be directly integrated with the function of detecting product defect. The computing device 3 can also achieve the function of detecting product defect by running a Software Development Kit (SDK).

Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the obtaining module 301 obtains an image of a product to be detected and analyzed (for a clear and simple description of the present disclosure, the image of the product is hereinafter referred to as a "detection image").

The product to be detected refers to a product that needs to be examined for defects. For example, the product to be detected can be a case of a mobile phone, a protective cover of a mobile phone, or any other suitable products.

In one embodiment, the obtaining module 301 may use a camera (not shown in the figures) to photograph the product to be detected to obtain a detection image of the product to be detected. The detection image of the product to be detected can also be stored in the storage device 31 in advance, and the obtaining module 301 can directly obtain the detection image of the product from the storage device 31.

At block S2, the execution module 302 cuts out a first preset number (the first preset number can be denoted as "N") of detection blocks from the detection image.

It should be noted that the "detection blocks" refers to blocks obtained from the detection image.

In one embodiment, the execution module 302 cuts out N detection blocks from the detection image with reference to predetermined N defect patterns of the product.

In one embodiment, the N defect patterns refer to appearances of defects with different shapes and/or sizes. Cutting out the N detection blocks from the detection image with reference to the predetermined N defect patterns of the product includes cutting out the N detection blocks from the detection image according to a shape and a size corresponding to each of the N defect patterns.

In one embodiment, cutting out the N detection blocks from the detection image according to a shape and a size corresponding to each of the N defect patterns includes copying the detection images into N copied images; and cutting out a detection block corresponding to one defect pattern from each of the N copied images according to the N defect patterns.

For example, three defect patterns are predetermined. The three defect patterns include a square with a first length and a first width, a rectangle with a second length and a second width, and a rectangle with a third length and a third width. The execution module 302 copies the detection image three times to obtain three copied images, the three copied images being denoted first copied image, second copied image, and third copied image. The execution module 302 cuts out the square with the first length and the first width from the first copied image, cuts out the rectangle with the second length and the second width from the second copied image, and cuts out the rectangle with the third length and the third width from the third copied image.

In one embodiment, the execution module 302 may determine the N defect patterns of the product according to multiple images of defective products.

Specifically, determining the N defect patterns of the product according to multiple images of defective products includes: marking shapes and sizes of defect patterns of each of the multiple images of the defective products to obtain marked detection images; using the marked detection images as a defect sample set; and using a clustering method to obtain the N defect patterns from the defect sample set.

In this embodiment, the clustering method may be a k-means clustering algorithm. In this embodiment, a parameter "k" of the k-means clustering algorithm is equal to N.

At block S3, the execution module 302 inputs the N detection blocks into an auto-encoder (AE) to obtain N reconstructed blocks.

It should be noted that the "reconstructed blocks" refer to image blocks reconstructed by the auto-encoder according to the detection blocks.

The auto-encoder is a neural network that uses a back propagation algorithm to render the output of the auto-encoder equal to the input. A self-encoder can include an encoder and a decoder. The encoder can compress the input into a latent space representation, and the output of the decoder is a reconstruction of the latent space representation.

In this embodiment, the execution module 302 trains the auto-encoder before inputting the N detection blocks into the auto-encoder. That is, the N reconstructed blocks are obtained by reconstructing the trained auto-encoder based on the N detection blocks.

Specifically, the training of the auto-encoder includes: collecting multiple images of flawless product; cutting out N blocks ("flawless blocks") from each of the multiple images of the flawless products with reference to the N defect patterns; using the N flawless blocks corresponding to each of the multiple images of the flawless products as a flawless sample, and using all flawless samples as a flawless sample set; the auto-encoder is then trained using the flawless sample set.

In this embodiment, cutting out N flawless blocks from each of the multiple images of the flawless products with reference to the N defect patterns includes: cutting out the N flawless blocks from each image according to a shape and a size according to each of the N defect patterns. Similarly, the execution module 302 can copy each of the multiple images of the flawless products into N flawless copied images, and cutting out a flawless block from each of the flawless copied images according to the N flaw patterns.

In this embodiment, the execution module 302 can calculate a mean square error (MSE) between each flawless block and a corresponding reconstructed block, the mean square error being used as a loss function to train the auto-encoder.

At block S4, the execution module 302 calculates a mean square error between each detection block and a corresponding reconstructed block, and establish an association between the mean square error and the detection block.

At block S5, the execution module 302 determines whether the product is defective according to the mean square error corresponding to each detection block.

In this embodiment, determining whether the product is defective according to the mean square error corresponding to each detection block includes: determining whether the mean square error corresponding to each detection block is greater than a preset value. When the mean square error corresponding to any detection block is greater than the preset value, determining that the product is defective, and when the mean square error corresponding to each detection block is not more than the preset value, determining that the product is flawless.

In this embodiment, the preset value may be an empirical value.

In this embodiment, detection blocks are cut out from the detection image with reference to the defect patterns, and accuracy of detecting defect of the product is improved.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

In the several embodiments provided in the preset disclosure, the disclosed computing device and method can be implemented in other ways. For example, the embodiments of the devices described above are merely illustrative. For example, the units are divided only according to logical function, and there can be other manners of division in actual implementation.

The modules described as separate components may or may not be physically separated, and the components displayed as modules may or may not be physical units, that is, they may be located in one place, or they may be distributed on multiple network units. Some or all of the modules can be selected according to actual needs to achieve the objectives of the solutions of the embodiments.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A product defect detection method applied to a computing device, the method comprising:
    obtaining a detection image of a product, and determining a plurality of defect patterns of the product, the plurality of defect patterns referring to appearances of defects with different sizes;
    cutting out a first preset number of detection blocks from the detection image, comprising: obtaining a plurality of copied images of the detection image; obtaining the first preset number of detection blocks by cutting out a rectangle from each of the plurality of copied images, according to the different sizes of the plurality of defect patterns;
    inputting the first preset number of detection blocks into an auto-encoder to obtain reconstructed blocks;
    calculating a mean square error between each detection block and a corresponding reconstructed block, and establishing an association between the mean square error and the detection block; and
    determining whether the product is defective according to the mean square error corresponding to each detection block.

2. The product defect detection method according to claim 1, wherein determining whether the product is defective according to the mean square error corresponding to each detection block comprises:
    determining whether the mean square error corresponding to each detection block is greater than a preset value;
    when the mean square error corresponding to any detection block is greater than the preset value, determining that the product is defective; and
    when the mean square error corresponding to each detection block is less than or equal to the preset value, determining that the product is flawless.

3. The product defect detection method according to claim 1, further comprising:
    determining the plurality of defect patterns of the product according to multiple images of defective products, comprising:
    marking shapes and sizes of the plurality of defect patterns of each of the multiple images of the defective products, and obtaining marked detection images;
    using the marked detection images as a defect sample set; and obtaining the plurality of defect patterns from the defect sample set by using a clustering method.

4. The product defect detection method according to claim 1, further comprising:
training the auto-encoder before inputting the first preset number of detection blocks into the auto-encoder, comprising:
collecting multiple images of flawless products;
cutting out the first preset number of flawless blocks from each of the multiple images of the flawless products with reference to the plurality of defect patterns;
using the flawless blocks corresponding to each of the multiple images of the flawless products as a flawless sample, and using all flawless samples as a flawless sample set; and
training the auto-encoder using the flawless sample set.

5. A computing device comprising:
at least one processor; and
a storage device storing computer-readable instructions, which when executed by the at least one processor, cause the at least one processor to:
obtain a detection image of a product, and determine a plurality of defect patterns of the product, the plurality of defect patterns referring to appearances of defects with different sizes;
cut out a first preset number of detection blocks from the detection image, comprising: obtain a plurality of copied images of the detection image; obtain the first preset number of detection blocks by cutting out a rectangle from each of the plurality of copied images, according to the different sizes of the plurality of defect patterns;
input the first preset number of detection blocks into an auto-encoder to obtain reconstructed blocks;
calculate a mean square error between each detection block and a corresponding reconstructed block, and establish an association between the mean square error and the detection block; and
determine whether the product is defective according to the mean square error corresponding to each detection block.

6. The computing device according to claim 5, wherein the at least one processor is further caused to:
determine whether the mean square error corresponding to each detection block is greater than a preset value;
when the mean square error corresponding to any detection block is greater than the preset value, determine that the product is defective; and
when the mean square error corresponding to each detection block is less than or equal to the preset value, determine that the product is flawless.

7. The computing device according to claim 5, wherein the at least one processor is further caused to:
determine the plurality of defect patterns of the product according to multiple images of defective products, comprising:
marking shapes and sizes of the plurality of defect patterns of each of the multiple images of the defective products, and obtain marked detection images;
using the marked detection images as a defect sample set; and
obtain the plurality of defect patterns from the defect sample set by using a clustering method.

8. The computing device according to claim 5, wherein the at least one processor is further caused to:
train the auto-encoder before inputting the first preset number of detection blocks into the auto-encoder, comprising:
collecting multiple images of flawless products;
cutting out the first preset number of flawless blocks from each of the multiple images of the flawless products with reference to the plurality of defect patterns;
using the flawless blocks corresponding to each of the multiple images of the flawless products as a flawless sample, and using all flawless samples as a flawless sample set; and
training the auto-encoder using the flawless sample set.

9. The computing device according to claim 5, wherein the at least one processor is further caused to:
cut out the first preset number of detection blocks from the detection image with reference to the plurality of defect patterns.

10. The computing device according to claim 5, wherein the plurality of defect patterns comprise a square with a first length and a first width, a rectangle with a second length and a second width, and a rectangle with a third length and a third width, the plurality of copied images being denoted a first copied image, a second copied image, and a third copied image, the at least one processor is further caused to:
obtain the first preset number of detection blocks by cutting out the square with the first length and the first width from the first copied image, cutting out the rectangle with the second length and the second width from the second copied image, and cutting out the rectangle with the third length and the third width from the third copied image.

11. A non-transitory storage medium having instructions stored thereon, when the instructions are executed by a processor of a computing device, the processor is configured to perform a product defect detection method, the method comprising:
obtaining a detection image of a product, and determining a plurality of defect patterns of the product, the plurality of defect patterns referring to appearances of defects with different sizes;
cutting out a first preset number of detection blocks from the detection image, comprising: obtaining a plurality of copied images of the detection image; obtaining the first preset number of detection blocks by cutting out a rectangle from each of the plurality of copied images, according to the different sizes of the plurality of defect patterns;
inputting the first preset number of detection blocks into an auto-encoder to obtain reconstructed blocks;
calculating a mean square error between each detection block and a corresponding reconstructed block, and establishing an association between the mean square error and the detection block; and
determining whether the product is defective according to the mean square error corresponding to each detection block.

12. The non-transitory storage medium according to claim 11, wherein determining whether the product is defective according to the mean square error corresponding to each detection block comprises:
determining whether the mean square error corresponding to each detection block is greater than a preset value;
when the mean square error corresponding to any detection block is greater than the preset value, determining that the product is defective; and
when the mean square error corresponding to each detection block is less than or equal to the preset value, determining that the product is flawless.

13. The non-transitory storage medium according to claim 11, the method further comprising:

determining the plurality of defect patterns of the product according to multiple images of defective products, comprising:
marking shapes and sizes of the plurality of defect patterns of each of the multiple images of the defective products, and obtaining marked detection images;
using the marked detection images as a defect sample set; and
obtaining the plurality of defect patterns from the defect sample set by using a clustering method.

14. The non-transitory storage medium according to claim 11, the method further comprising:
training the auto-encoder before inputting the first preset number of detection blocks into the auto-encoder, comprising:
collecting multiple images of flawless products;
cutting out the first preset number of flawless blocks from each of the multiple images of the flawless products with reference to the plurality of defect patterns;
using the flawless blocks corresponding to each of the multiple images of the flawless products as a flawless sample, and using all flawless samples as a flawless sample set; and
training the auto-encoder using the flawless sample set.

15. The product defect detection method according to claim 1, wherein cutting out the first preset number of detection blocks from the detection image comprises:
cutting out the first preset number of detection blocks from the detection image with reference to the plurality of defect patterns.

16. The product defect detection method according to claim 1, wherein the plurality of defect patterns comprise a square with a first length and a first width, a rectangle with a second length and a second width, and a rectangle with a third length and a third width, the plurality of copied images being denoted a first copied image, a second copied image, and a third copied image, obtaining the first preset number of detection blocks by cutting out the rectangle from each of the plurality of copied images, according to different sizes of the plurality of defect patterns comprises:
obtaining the first preset number of detection blocks by cutting out the square with the first length and the first width from the first copied image, cutting out the rectangle with the second length and the second width from the second copied image, and cutting out the rectangle with the third length and the third width from the third copied image.

17. The non-transitory storage medium according to claim 11, wherein cutting out the first preset number of detection blocks from the detection image comprises:
cutting out the first preset number of detection blocks from the detection image with reference to the plurality of defect patterns.

18. The non-transitory storage medium according to claim 11, wherein the plurality of defect patterns comprise a square with a first length and a first width, a rectangle with a second length and a second width, and a rectangle with a third length and a third width, the plurality of copied images being denoted a first copied image, a second copied image, and a third copied image, obtaining the first preset number of detection blocks by cutting out the rectangle from each of the plurality of copied images, according to different sizes of the plurality of defect patterns comprises:
obtaining the first preset number of detection blocks by cutting out the square with the first length and the first width from the first copied image, cutting out the rectangle with the second length and the second width from the second copied image, and cutting out the rectangle with the third length and the third width from the third copied image.

\* \* \* \* \*